Feb. 26, 1929.

F. C. STUART 1,703,254

SPRING SWITCH AND LOCKING MEANS THEREFOR

Filed Nov. 18, 1926  3 Sheets-Sheet 1

Witness:
R. B. Davison

Inventor:
Frederick C. Stuart
By Anthony Chemis
Atty.

Feb. 26, 1929.
F. C. STUART
1,703,254
SPRING SWITCH AND LOCKING MEANS THEREFOR
Filed Nov. 18, 1926   3 Sheets-Sheet 2
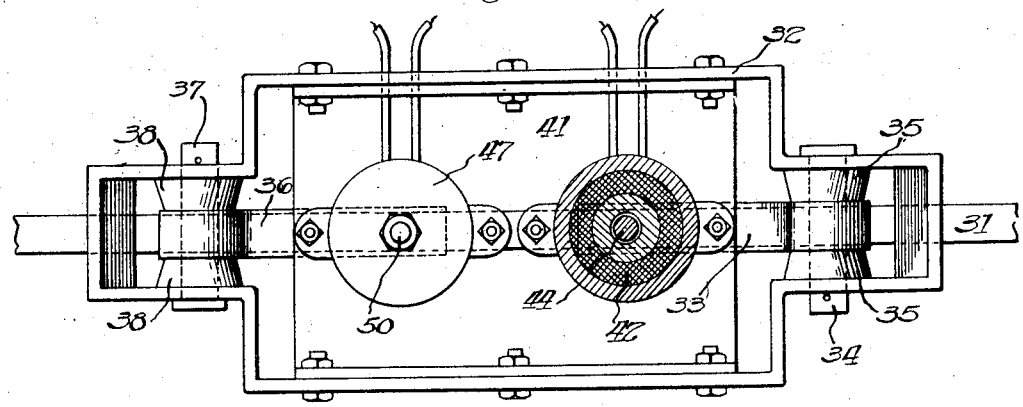
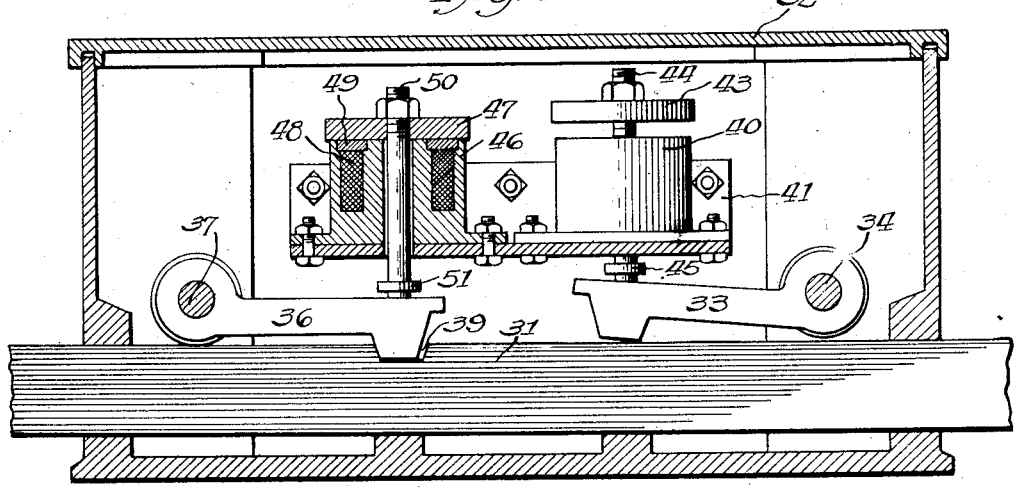
Witness:
R. B. Davison.
Inventor
Frederick C. Stuart
By R. Anthony Reina
Atty.

Feb. 26, 1929. 1,703,254
F. C. STUART
SPRING SWITCH AND LOCKING MEANS THEREFOR
Filed Nov. 18, 1926 3 Sheets-Sheet 3

Fig. 5

Inventor
Frederick C. Stuart

Witness:
R. B. Davison

Patented Feb. 26, 1929.

1,703,254

UNITED STATES PATENT OFFICE.

FREDERICK C. STUART, OF JOLIET, ILLINOIS.

SPRING SWITCH AND LOCKING MEANS THEREFOR.

Application filed November 18, 1926. Serial No. 149,085.

My invention relates to an improvement in railway track switches of the split type in which the point or switch rails are connected to an operating stand by means of a coil spring so designed as to normally hold the switch in closed position and to automatically return the switch points to their normal or closed position after a train has trailed through them.

The primary object of my invention is the provision of a spring switch having locking means associated therewith which lock the switch points after they have been opened by a pair of car wheels until after the entire train has passed through the said switch and which thereupon release the said switch points and allow them to return to their normally closed positions, with suitable cushioning means to prevent the switch points being thrown against the sides of the cooperating rails with such force that they are broken or damaged.

This type of switch is commonly used where a double track leads into a single track, the switch being normally in closed position and is opened by trains running from double track onto the single track, the switch points being crowded over to the proper position by the flanges on the engine and car wheels. After the train has passed through, the spring attached to the switch points automatically returns the switch to the position it occupied before the train passed through.

The principal difficulty with this type of switch is that immediately after the wheel runs off of the point, the switch is thrown back to its normal position and is operated again by the next set of wheels that passes through it. This continuous operation of the switch by long trains wears out the switch points and connections with great rapidity and makes the switch accordingly expensive to maintain and keep in repair. The constant vibration and wear of the switch frequently breaks bolts and connections so as to render the switch unsafe for use, especially with trains running against the points or from single track to double track.

Another and further object of my invention is the provision of automatic locking means for railway switches of the spring type in which the switch points are locked in closed position and retained in such position by electrical locking means operated by a pair of car wheels running against the said switch points and which also effectively lock the switch against tampering or prying open the switch points as it might be possible to accomplish with the ordinary type of switch stands.

Another and further object of my invention is the provision of a spring switch which is durable in service, which is not easily broken or damaged in use and which is simple and positive in its operation.

These and other objects of my invention will be more fully and better understood by reference to the accompanying drawings in which:—

Figure 2 is a top view of my improved locking device partially in section;

Figure 3 is a side view partially in section and partially in elevation of the locking device shown in Figure 2;

Figure 5 is a wiring diagram showing the electrical circuits leading to various operating parts of the apparatus.

Figure 1:
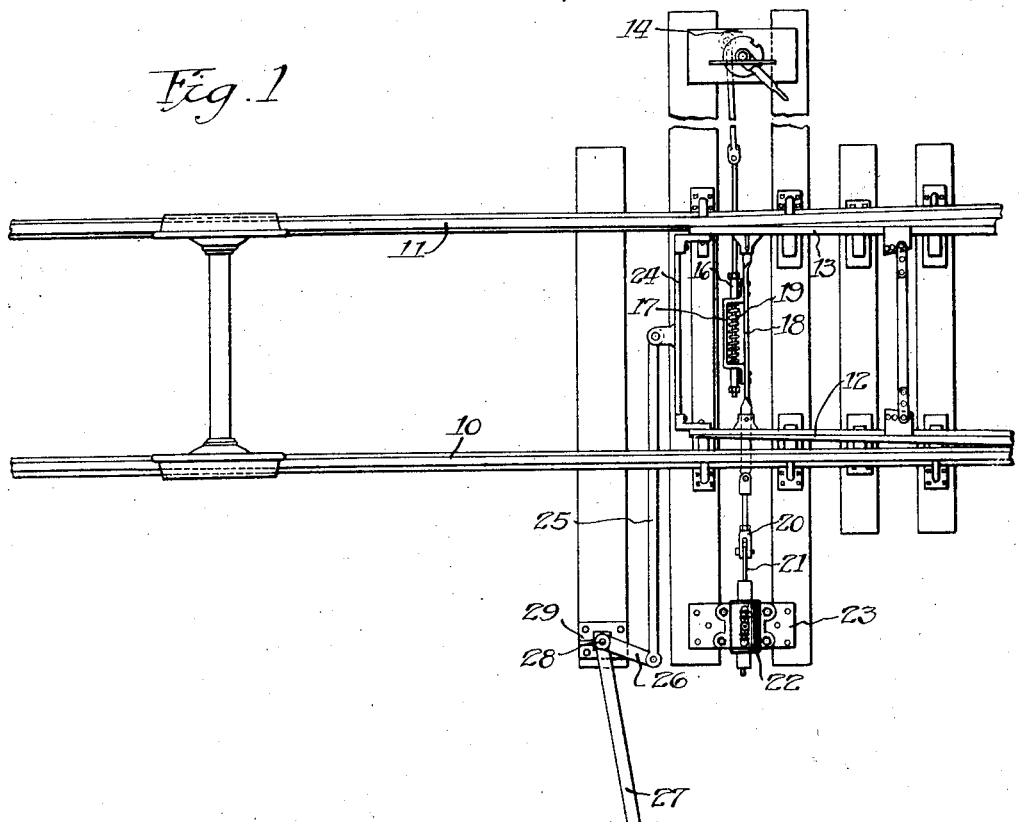
Figure 1 is a plan view of my improved invention.

Referring now specifically to the drawings, a track comprising a pair of rails 10 and 11 are shown (Figure 1) with a pair of other split rails 12 and 13 adapted to engage against the sides of the rails 10 and 11 in the usual manner. The rail 13 forms a continuation of one of the rails making up a main track section, and the rail 12 is one of the rails forming the beginning of a switch track section or cross-over leading from the main line, the rail 11 being curved in the usual manner to form the beginning of the other rail for the switch track section. The usual switch stand 14 is provided, having a connecting rod 15 leading therefrom and secured to a second rod 16 which extends through a loop 17 secured at each of its ends to a switch throw rod 18 which is connected at each of its ends to the rails 12 and 13.

A coil spring 19 is provided which is mounted inside of the loop 17 which normally exerts its force in the direction of the switch stand 14 so as to hold the switch in normally closed position, but which allows the switch points 12 and 13 to move into open position when a car or locomotive passes therethrough and onto the rails 10 and 11. Secured to the rod 18 at its outer end is a turn buckle 20 to which the piston rod 21 is secured, the said piston rod extending into a locking and cushioning cylinder 22 which is mounted upon a plate 23 secured to the cross ties in any approved manner.

A connecting bar 24 is provided which is connected to the rails 12 and 13 at the outer ends thereof and which has a second bar 25 secured thereto with a crank having a short arm 26 connected to the outer end of the bar 25 and a long arm 27, the said crank being pivotally mounted by means of a pin 28 upon a plate 29 secured to a cross tie in any approved manner. A bar or rod 30 is connected to the outer end of the long arm 27 of the crank and has a locking bar 31 secured thereto which leads into a locking casing 32. The said locking casing 32 has a normal locking dog 33 mounted upon a pin 34 with filler blocks 35 mounted on each side of the locking dog 33 and having at the opposite end of the casing 32 a reverse locking dog 36 mounted upon a pin 37 with filler blocks 38, 38 on each side thereof, the said locking dogs being adapted to alternately engage in a notch 39 formed in the upper side of the locking bar 31. Positioned in the casing 32 is a normal locking magnet 40 which is secured to a magnet supporting frame 41 in any approved manner. The said magnet 40 has a coil 42 therein and an armature 43 above said magnet 40 and a guide pin 44 positioned therein and extending downward through the magnet and resting upon the locking dog 33. The lower end of the pin has an enlarged portion 45 formed therein which acts as a stop to prevent the guide pin 44 from being pushed upward to such a distance that the armature 43 will not operate when the magnet is energized. A reverse locking magnet is provided which is made up of a magnet core 46, an armature 47, a coil 48, a ring 49 with a guide pin 50 having an enlarged portion 51 and which extends down into engagement with the locking dog 36 and which is adapted to engage in the notch 39 when the switch is in open position, as will be more fully described hereinafter.

Figure 4:
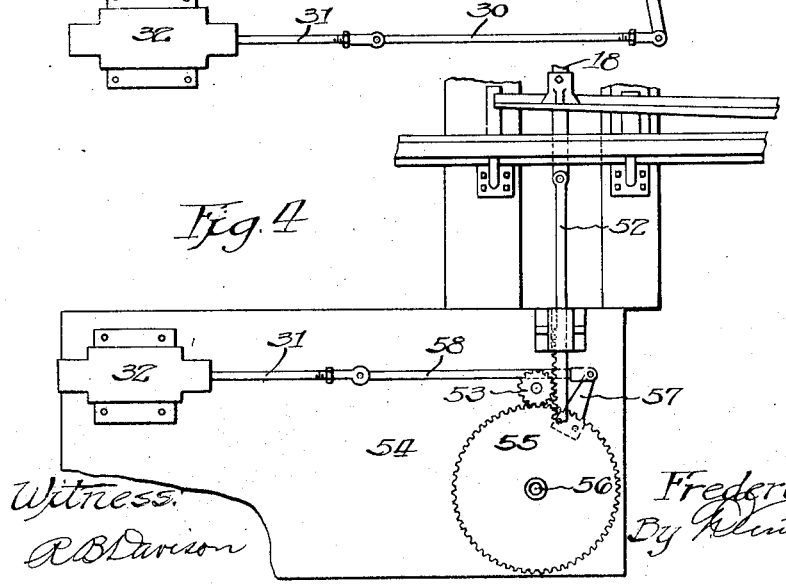
Figure 4 is a modification of the connecting means from the locking device to the switch points.

An alternative form of this connecting device leading to the locking device is illustrated in Figure 4 wherein a rack bar 52 is shown which is connected directly to the bar 18 and engages a gear wheel 53 mounted upon any suitable foundation 54, the said gear wheel 53 engaging a larger gear 55 rotatably mounted upon a stud 56 and having an arm 57 extending outwardly therefrom to which a pull rod 58 is secured and which in turn is secured to the locking bar 31 leading into the locking case 32.

Referring to Figure 5 wherein is shown a wiring diagram illustrating the operation of the device, a plurality of main line track sections A and B are shown having a switch track comprising a pair of sections X and Y leading therefrom, each of said sections of track being insulated from each other by sections of insulation I in the usual manner. The track section X has a pair of rails 59 and 60 with wires 61 and 62 leading therefrom to an electric battery 63. Connected to the rail 59 is a second wire 64 which leads to a relay 65 with another wire 66 leading therefrom and which is connected to the rail 60 so that in normal operation of the device, a complete circuit is established through the wheels of the car in contact with the rails 59 and 60 and through the wire 64, the rail 59, wire 64, through the relay coil 65, wire 66, rail 60 and wire 62, back to the battery 63. The track section B is composed of a pair of rails 67 and 68 with the wires 69 and 70 leading therefrom to a battery 71. The rail 67 has a wire 72 leading therefrom to a relay coil 73, with a wire 74 leading from the relay coil 73 to the rail 68 so that a circuit from the battery 71 is established during normal operation of the device through the relay coil 73. A battery 75 is provided having a connecting wire 76 leading therefrom to a switch 77 which, in turn, has a wire 78 leading therefrom and which is connected to the normal locking magnet 40. A wire 79 leads from the magnet 40 to a contact point 80 which is adapted to cooperate with the contact member 81 actuated by the relay 73 and shown in the drawing in open position, the circuit to the magnet 40 being completed through the contact members hereinafter described.

A second wire 82 leads from the battery 75 to a contact member 83 which is adapted to cooperate with the contact 84 having a wire 85 leading therefrom and which leads to the reverse locking magnet 46 with wire 86 leading therefrom which is connected to the wire 78 leading from the negative side of the battery 75. A circuit to the magnet 40 is established from the battery 75 through the leads 78 and 79, and contacts 80 and 81 and lead 82, and the circuit to the magnet 46 is established through the leads 78 and 85 and contacts 83 and 84 operated by the relay 65. Secured to the lead 82 is a lead 87 which is connected to a contact point 88 in normal engagement with a relay member 89 and which in normal operation of the device is held in the position shown in the drawing (Figure 5) so that all sections leading from the battery 75 to the various locking coils are disconnected.

In the operation of the device, when a car wheel passes out over the track section X, a short circuit is established to the battery 63 which allows the relay members 89 and 83 to drop establishing a contact of member 83 with the member 84, thereby establishing a circuit through the locking magnet 46 in the locking device 32, thereby energizing this magnet. As the wheels continue to pass outward on the rails, the switch points 12 and 13 are pushed over until the switch is in open position and the locking bar 31 is moved longitudinally of the locking device 32 until the notch 39 is under locking dog 36 and as the electric current is passing through the magnet 46 the locking dog 36 will be forced into the notch 39 and held therein, thus securely locking the switch in open position and holding it as long as the battery 63 is short circuited by the car wheels passing over the rails 59 and 60. As soon as the wheels of the last car pass from the rails 59 and 60 then the current passes through the relay coil 65 which is thereby energized and picks up the relay points 83 and 89, preventing contact between the members 83 and 84 so that the magnet 46 is de-energized which allows the locking dog 36 to be thrown out of the notch 39 by the action of the coil spring 19 and allowing the switch to return to normal closed position.

In the case of a train proceeding in the opposite direction, that is, against the switch points 12 and 13, the battery 71 is short-circuited so that the relay coil 73 is de-energized and contact is established between the relay member 81 and the contact 80 which results in the magnet 40 of the locking device 32 being energized and forcing the guide pin 44 down upon the top of the locking dog 31 and into the notch 39, and thus effectively locks the switch in closed position, as long as the battery 71 is short-circuited by the wheels passing over the rails 67 and 68.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A locking device for spring switches comprising, in combination, a locking member, connections between said locking member and the switch, and electrical means controlled by the passage of cars over the switch whereby the said locking member is held in locked position during the passage of a train of cars over the said switch.

2. A locking device for spring switches comprising, in combination, a locking member, connections between said locking member and the switch, and electrical means controlled by the passage of cars over the switch whereby the said switch is locked in open position when opened and also locked in closed position when closed.

3. A locking device for spring switches comprising, in combination, a locking bar, locking dogs mounted in cooperative relation with said locking bar, electro-magnets adapted when energized, to hold said dogs in locked relation with said bar, and electrical connections for energizing said magnets by the passage of a train of cars over said switch.

4. A locking device for spring switches comprising, in combination, a locking bar, means for connecting the said locking bar to a switch, a pair of magnets, a pair of locking dogs, and electrical connections whereby the said locking magnets are alternately energized by the passage of a train over the said switch, the said magnet operating to hold the locking dogs in operative relation with the said locking bar.

5. A locking device for spring switches comprising, in combination, a locking bar, means for connecting the said locking bar to a switch, a pair of magnets, a pair of locking dogs, and electrical connections whereby the said locking magnets are alternately energized by the passage of a train over the said switch, the said magnet operating to hold the locking dogs in operative relation with the said locking bar.

6. A control mechanism of spring switches comprising in combination, a locking cylinder, electrical control apparatus for controlling the operation of the said cylinder and a rack bar connected to said switch and piston in said cylinder and gear connections between said locking bar in said piston whereby said locking cylinder is connected to the said switch.

Signed at Joliet, Illinois, this 6th day of November, 1926.

FREDERICK C. STUART.